United States Patent Office 3,404,042
Patented Oct. 1, 1968

3,404,042
ELECTRIC BATTERY USING ORGANIC CHARGE TRANSFER LIQUID
Eric Otto Forster, Scotch Plains, and Arthur Walter Langer, Jr., Watchung, N.J., assignors to Esso Research and Engineering Company, a corporation of Delaware
No Drawing. Filed Sept. 1, 1966, Ser. No. 576,561
5 Claims. (Cl. 136—154)

This invention relates to an electric battery which is characterized by use therein of an organic liquid solution of dissolved organo-lithium as a charge transfer compound between electrodes. It relates to the use of a pair of organic materials in the solution for obtaining a secondary battery, in which the electrode reactions are nearly reversible. More particularly, this invention relates to the use of a solution of an aralkyl lithium and a stable Lewis base for obtaining a secondary battery.

Organic materials that act as oxidizing depolarizers have been suggested for use with a reactive electrode in a primary cell. More recently, solid organic complexes have been reported to be useful in miniature batteries. The prior art has been undeveloped with respect to the use of an organic liquid solution which can be used even with unreactive electrodes to form a secondary battery.

Now, in accordance with the present invention a secondary battery can be obtained by use in combination with solid electrodes, anode and cathode, of an aralkyl lithium mixed with a stable Lewis base in a liquid organic solvent which avoids polarization.

The organo-lithium compound used may be selected from the aryl methyl lithium compounds containing 1 to 3 aryl groups, especially phenylmethyl lithium compounds. A preferred organo-lithium compound for the present purpose is diphenyl methyl lithium:

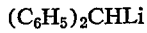

The general formula is RLi, wherein R represents the hydrocarbon groups. This compound gives excellent results with regards to solubility and capacity for carrying a negative charge. The aryl moiety may have one or more substituents, such as alkyl, aryl, cycloalkyl, etc., to modify solubility or electrical properties.

The Lewis base compound mixed with the organo-lithium compound is considered to stabilize the organo-lithium compound in its transition state and is preferably a chelating Lewis base selected from the group polyethers, tertiary aminoethers and tertiary polyamines. Some non-limiting examples include pentamethyl-diethylenetriamine; N,N,N',N' - tetramethyl-1,2-decanediamine; N,N,N',N'-tetraethyl - 1,2 - ethanediamine; N,N,N',N' - tetramethyl-1,2-cyclohexanediamine; methyl beta - dimethylaminoethyl ether; N,N,N',N'-tetramethyl - 1,3 - butanediamine; 1,2-dimethoxyethane; and butyl dimethyl amine. Most preferred are the chelating tertiary amines such as N,N,N',N'-tetramethyl ethylenediamine (TMEDA):

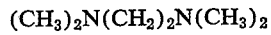

The Lewis base must be stable with respect to the organo-lithium compound; that is, it should not undergo metalation, cleavage or other reactions which decompose the organo-lithium compound under the conditions used. In general, one can use less stable bases with the more resonance-stabilized, less reactive organo-lithium compounds. The Lewis base stability toward carbanion attack from organo-lithium compounds increases in the order polyethers, tertiary aminoethers, tertiary polyamines.

For the purpose of this invention, the solvent may be any inert organic solvent such as normal or branched paraffins, cycloparaffins, aromatics such as benzene, toluene or xylene, aprotic Lewis bases such as tertiary amines, etc.

An aromatic hydrocarbon is the preferred solvent for the organo-lithium Lewis base pair for solvency and enhancement of electron release and transfer although other inert organic solvents may be used, including the Lewis bases described above, provided they do not adversely affect the RLi/Lewis base charge transfer interaction.

The batteries or cells containing the solution of aralkyl lithium and Lewis base can be made in various forms and sizes. The secondary battery may have the solution between pairs of thin sheets or plates of the electrodes encased in a container that is insoluble in the solution. A number of such unit cells may be connected together in series for increased voltage. The battery may be made in a form like that of the common dry cell, wherein one electrode, e.g., anode, serves as the container and the other electrode is centrally spaced from the container. Porous, solution-permeable separators may be placed between the electrodes.

On discharge of the battery electrons are withdrawn to the external circuit from the anode or negative plate. On charge, the flow of electrons from an external source is reversed through the cell.

This invention is illustrated by the following examples:

EXAMPLE 1

A solution containing 0.2 mole of diphenyl methyl lithium (DPMLi) and 0.4 mole of tetramethylethylenediamine (TMEDA) per one liter of toluene was prepared in an oxygen and moisture free atmosphere. This solution was poured into a glass cell containing rectangular platinum electrodes approximately 1 cm.$^2$ in area spaced about 3 mm. apart. The specific conductance of this solution, at 23° C., was found from AC conductance measurements to be $7.4 \times 10^{-4}$ (ohm cm.)$^{-1}$. If either of the constituents alone was used at the same concentration level, the respective specific conductivities were about $10^{-9}$ (ohm cm.)$^{-1}$ for the DPMLi and $10^{-8}$ (ohm cm.)$^{-1}$ for the TMEDA. The solvent, toluene, by itself had a specific conductivity of about $10^{-13}$ (ohm cm.)$^{-1}$.

The conductivity cell was then polarized by the application of an external potential of 2 volts for 10 minutes. The open voltage of the cell was then measured and found to be 0.48 volt and this potential lasted for over 100 hrs. after which time the test was terminated.

EXAMPLE 2

A solution similar to that described in Example 1 was prepared but the ratio of DPMLi to TMEDA was 1 to 1 instead of the 1 to 2 used previously. The ensuing solution was found to be less conductive by an order of magnitude [about $6 \times 10^{-5}$ (ohm cm.)$^{-1}$] and no practically significant discharge rates could be achieved. This is in line with the commonly accepted idea that the electrolyte solution used in a battery should be of reasonably low resistance to make the internal IR drop (voltage drop) as small as possible. The results of this experiment indicated an open potential of less than 0.2 volt and no further work was done on this system.

EXAMPLE 3

A solution similar to that described in Example 1 was prepared except that it was twice as concentrated, i.e., 0.4 mole of DPMLi and 0.8 mole of TMEDA were used per liter of toluene. The cell was again the same as that used for Examples 1 and 2.

Before applying a polarizing voltage the open voltage of the cell was determined using a high impedance voltmeter (Model 610A Keithley). The meter indicated less than 0.05 volt which is close to the lower limit of detectable voltages for this meter. In attempting to read a possible current, the meter was put to read current across a 1000 ohm resistor and a current of $5 \times 10^{-10}$ amps was detected. The cell was then polarized by the application of 1 volt. This potential caused a momentary increase in current to about $1 \times 10^{-4}$ amps which dropped off rapidly. Application of 2 volts on the other hand resulted in a steady charging current of $3 \times 10^{-3}$ amps. The polarizing potential was removed after a few minutes and the open potential measured. Then the cell was allowed to discharge across an electrical load of 1000 ohms and the current produced by it was measured. This sequence of events, i.e., charging for about 10 minutes and discharging for 10–15 min. was repeated several times and the results are shown in the following table.

| Run No. | Open potential (V) | Discharge current (amps/cm.$^2$) |
|---|---|---|
| 1 | 0.48 | $1.6 \times 10^{-4}$ |
| 2 | 0.46 | $1.4 \times 10^{-4}$ |
| 3 | 0.46 | $1.4 \times 10^{-4}$ |

Instead of platinum electrodes use can also be made of stainless steel, aluminum or other rather unreactive metal electrodes. If the polarization step is not desirable one of the electrodes, the anode, can be made of Mg, Ni or some similarly reactive metal while the cathode will be selected from the passive type of electrode materials such as the platinum metals, graphite or carbon, or aluminum or stainless steel.

The electrolyte should be used in concentrations in excess of 0.1 molar with a range of 0.2 to 0.6 or saturation whichever is higher preferred, and the ratio of Lewis base to organo-lithium should be greater than about 1:1 with a ratio greater than about 2:1 preferred. In general, the concentration of electrolyte and its composition should be made such that the ensuing electrolyte solution has a specific conductivity of from $10^{-4}$ (ohm cm.)$^{-1}$ to $10^{-1}$ (ohm cm.)$^{-1}$.

What is claimed is:

1. In an electric battery cell, the combination of electrodes with a charge transfer organic solution of organo-lithium and a Lewis base.

2. In an electric battery cell defined in claim 1, the electrodes being unreactive, the organo-lithium being an aralkyl lithium, and the Lewis base being a chelating compound that is stable with respect to the organo-lithium.

3. In an electric battery cell as defined in claim 1, in which phenyl methyl lithium as the organo-lithium and tetramethylethylenediamine as the Lewis base are present in hydrocarbon solvent in a ratio to give the resulting liquid organic solution a specific conductivity in the range of $10^{-4}$ (ohm cm.)$^{-1}$ to $10^{-1}$ (ohm cm.)$^{-1}$.

4. An electric battery cell as defined in claim 1, in which one of the electrodes serving as a cathode on discharge being unreactive solid material, said cell being polarized by application of polarizing voltage which reverses discharge reactions in the cell.

5. In an electric battery cell as defined by claim 1, said charge transfer solution being a toluene solution of diphenyl methyl lithium and of tetramethylethylenediamine.

References Cited

UNITED STATES PATENTS

| | | | |
|---|---|---|---|
| 3,043,896 | 7/1962 | Herbert et al. | 136—154 XR |
| 3,073,884 | 1/1963 | Pinkerton | 136—154 XR |
| 3,110,630 | 11/1963 | Wolfe | 136—154 |

WINSTON A. DOUGLAS, *Primary Examiner.*

D. L. WALTON, *Assistant Examiner.*